July 21, 1959
R. A. DWYER
2,895,769
SELF-ALIGNING BEARING
Filed July 20, 1956
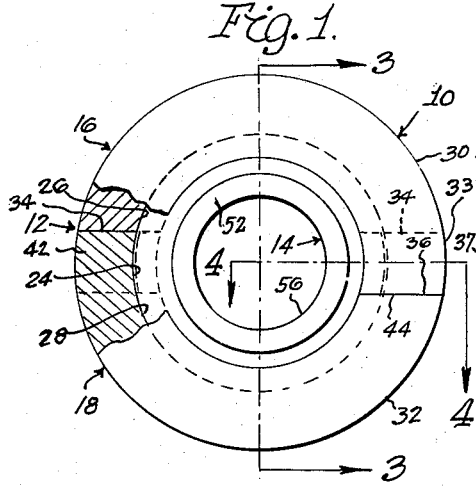
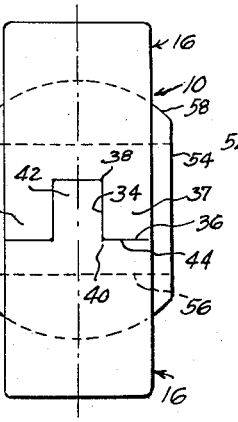
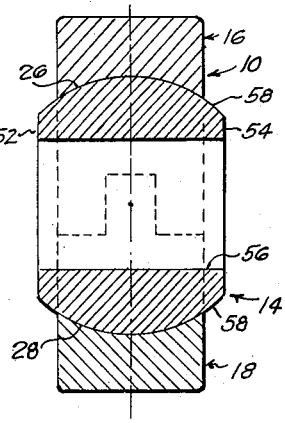
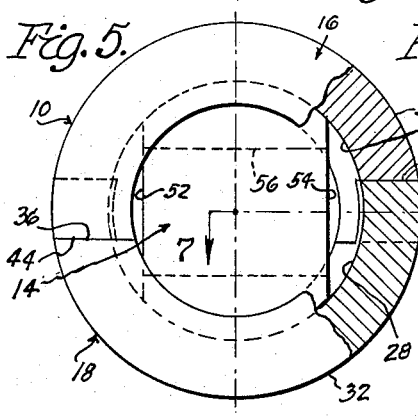
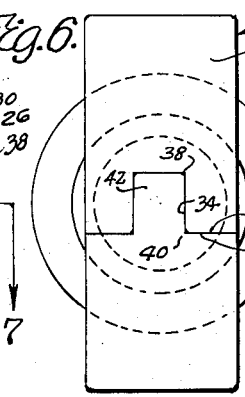
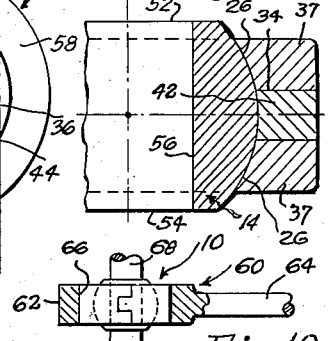
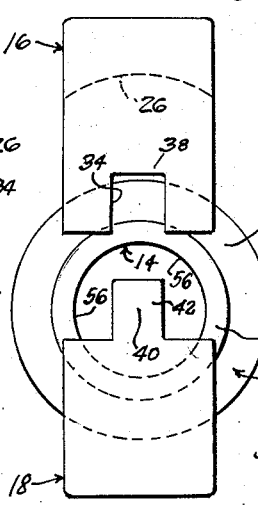
INVENTOR.
Russell Dwyer
Barthel + Bugbee
Attys

United States Patent Office 2,895,769
Patented July 21, 1959

2,895,769

SELF-ALIGNING BEARING

Russell A. Dwyer, Wolverine, Mich.

Application July 20, 1956, Serial No. 599,221

2 Claims. (Cl. 308—72)

This invention relates to self-aligning bearings and, in particular, to self-aligning spherical bearings.

One object of this invention is to provide a self-aligning spherical bearing which can be made up of components which fit together accurately with predetermined clearances and without the necessity for using bearing inserts of bronze or other bearing metal, with consequent distortion of the parts as a result of the installation of such inserts.

Another object is to provide a self-aligning spherical bearing, the outer bearing unit or socket unit of which is made up of half components which are accurately fitted and held together in engagement by simple yet effective means.

Another object is to provide a self-aligning spherical bearing of the foregoing character with components which adapt themselves of being produced by forging, if so desired, the half components of the outer bearing unit or socket unit being capable of being easily and accurately provided with concave spherical bearing surfaces adapted to precisely receive and engage an inner bearing member or ball member in the form of a diametrically-bored bearing ball with an accurately-spherical convex surface adapted to precisely fit the internal concave surface of the outer bearing unit.

Another object is to provide a self-aligning spherical bearing of the foregoing character wherein the interfitting semi-annular halves of the bearing are of unequal circumferential extent, and are normally held together by the inner bearing member under operating conditions, but are rendered capable of separation and disassembly by swinging the inner and outer bearing members until their central planes are perpendicular to one another.

This is a continuation-in-part of my co-pending application Serial No. 438,209, filed June 21, 1954, for Self-Aligning Rod End Bearing, which became U.S. Patent No. 2,795,465, issued June 11, 1957.

Other objects and advantages of the inveniton will become apparent during the course of the following description of the accompanying drawings, wherein:

Figure 1 is a side elevation, partly in section, of a self-aligning annular spherical bearing, according to one form of the invention;

Figure 2 is a right-hand side elevation of the bearing shown in Figure 1;

Figure 3 is a central vertical section taken along the line 3—3 in Figure 1;

Figure 4 is a fragmentary horizontal section taken along the line 4—4 in Figure 1;

Figure 5 is a side elevation, partly in section, of the self-aligning annular spherical bearing shown in Figure 1, but with the inner component or ball rotated 90° to the outer component prior to disassembling the components;

Figure 6 is a right-hand side elevation of the bearing shown in Figure 5;

Figure 7 is a fragmentary horizontal section taken along the line 7—7 in Figure 5;

Figure 8 is a side elevation similar to Figure 5, but showing the outer half components separated from one another for disassembly;

Figure 9 is a right-hand side elevation of the partly disassembled bearing shown in Figure 8; and Figure 10 is a fragmentary vertical section, partly in side elevation, of an actual installation of a self-aligning spherical bearing of the present invention.

Hitherto, self-aligning spherical bearings have been difficult to manufacture because of the necessity of assembling a ball-shaped inner bearing member within a concave spherical bearing recess, the end openings of which are smaller in diameter than the diameter of the inner bearing member in its central plane. Various subterfuges have been adopted to overcome this problem of solid geometry. In one solution, the outer bearing member on one side was formed with an approximately cylindrical opening to admit the inner bearing member or ball, after which the metal around the opening was deformed to cause it to conform to the outer spherical surface of the ball. This procedure, however, resulted in the deformation of the convex and concave bearing surfaces, with the result that geometrically-inaccurate bearing surfaces were produced. In another prior self-aligning spherical bearing, the outer ends of the bearing opening in the outer bearing member were made large enough to admit the ball or inner bearing member, the outer ends of the opening being closed, after inserting the ball therein, by approximately annular bearing inserts of bronze or other suitable bearing metal forced into the clearance space between the outer and inner bearing members from opposite sides of the outer bearing member. The latter construction, however, also resulted in deformation of the bearing surfaces, with consequent inaccuracy of engagement.

The self-aligning spherical bearing of the present invention, briefly described, consists of an outer bearing unit or socket unit made up of interlocking approximate halves having tongue and groove connections at their opposite ends, with the halves, including the tongues or groove side portions extending slightly more than a semi-circle circumferentially. In this manner, by using a flat-sided inner member or ball with its opposite sides cut off parallel, the ball itself holds the parts together when their median planes coincide as shown in Figures 1 to 4 inclusive, yet permits disassembly when the ball is turned so that its median plane is perpendicular to the median plane of the outer bearing unit, as shown in Figures 5 to 9 inclusive.

Referring to the drawings in detail, Figures 1 to 4 inclusive show the self-aligning spherical bearing of the present invention, generally designated 10, as consisting generally of an outer bearing unit or socket unit 12 containing an inner bearing member or ball member 14. The outer bearing unit 12 is made up of approximate half components, generally designated 16 and 18 respectively, the outer bearing unit 12 being provided with a bearing recess 24 having a spherically curved surface divided into half zones or half portions 26 and 28 respectively located in the half components 16 and 18.

The half components 16 and 18 of the outer bearing unit 12 are roughly in the shape of question marks facing one another, with approximately half annular or half cylindrical surfaces 30 and 32 respectively, forming in assembly a full cylindrical external surface 33. Each outer end of the half component 16 is provided with a circumferentially-elongated notch 34 of rectangular shape in the end surface 36 thereof, thus providing circumferentially-elongated fingers 37 at the opposite sides of each notch 34 and forming a crenellated portion 38 (Figure 2) which receives the oppositely-crenellated portion 40 of the half component 18 consisting of a circumferentially-elongated rectangular-shaped tongue 42 projecting from the end surface 44 thereof and fitting into the notch 34. The interfitting crenellated portions 38 and 40 thus extend in opposite directions beyond the cross-diameter at the section line 7—7 (Figure 5).

The inner bearing member or ball member 14 is in the shape of a ball with flattened zonal opposite sides 52 and 54 and a bore 56 therethrough for receiving the bolt, stud, pin, shaft or other element 60 to which the self-aligning spherical bearing 10 of the present invention is to be connected. The inner bearing member or ball 14 is provided with an external spherical surface 58 which accurately fits the concave or internal spherical surfaces 26 and 28 of the outer bearing unit or socket unit 12 with a sufficient clearance therebetween to permit suitable relative movement therebetween.

In the operation of the invention, let it be assumed that the various parts of the self-aligning spherical bearing 10 have been disassembled as shown in Figures 8 and 9, into the inner bearing member or ball member 14 and the outer bearing unit halves or half components 16 and 18. To assemble the bearing 10 from these parts, the assembler places the inner bearing member or ball member 14 into one of the concave spherical surface portions 26 or 28 in one of the half components 16 or 18, with its median plane at right angles to the median plane of the half component 16 or 18. He then brings the other half component downward into engagement with the ball member 14, causing the tongues 42 to enter the notches 34, as shown in Figures 5 and 6. Finally, the assembler turns the inner unit or ball member 14 around a diameter through its median plane so as to swing its median plane into coincidence with the median plane of the outer bearing unit, whereupon the spherical convex surface 58 on the ball member 14 serves as a key to lock the components 16 and 18 together by engaging the spherical surfaces 26 and 28 of the diametrically overhanging portions 37 and 42 at the ends of the outer half components 16 and 18. These portions 37 and 42 serve as overlapping fingers holding these half components 16 and 18 in assembly with one another without possibility of accidental disassembly during ordinary oscillation of the ball 14 in its use. The bearing 10 is disassembled into its various components by reversing the order of assembly as described above.

The self-aligning spherical bearing 10 of the present invention is used in any location or for any purpose where conventional self-aligning bearings have previously been used, one installation being shown in Figure 10. In this installation, generally designated 60, the head 62 of a connecting rod 64 is provided with a bore 66 snugly receiving the cylindrical outer surface 33 of the outer component 16, with the ball 14 of course already installed, in the manner described above. A shaft or rod 68 passing through the bore 56 in the ball member 14 is thereby mounted in a self-aligning relationship relatively to the connecting rod 64. In place of the connecting rod 64, the portion 62 may represent the side wall of a housing in which the bearing 10 is mounted, with the rod 68 passing through the bore 56 in the ball member 14 for self-aligning bearing support.

What I claim is:

1. A self-aligning spherical bearing comprising an annular outer bearing unit having a central plane and opposite sides disposed substantially parallel thereto, said outer bearing unit being composed of a pair of arcuate outer bearing unit components disposed in a substantially annular path with their adjacent ends disposed in interfitting relationship with one another, said outer bearing unit having a central opening therein containing a spherically-curved internally-concave annular surface forming a ball socket, and an inner ball member seated in said socket and having a spherically-curved convex outer surface fitting the spherically-curved concave surface of said socket, each of said arcuate outer bearing unit components having a circumferential extent exceeding a semi-circle, said ball member having a central plane passing through its center of curvature and cutaway opposite sides whereby rotation of said ball member into a position with its central plane approximately perpendicular to the central plane of said outer bearing unit releases the components thereof for disassembly but retains the same in assembly when said central planes are rotated substantially into coincidence with one another, one of said outer bearing unit components having circumferentially-elongated tongues disposed at its opposite ends extending circumferentially beyond the opposite ends of the diameter of the component and the other outer bearing unit component having circumferentially-elongated notches receiving said tongues, the portions of said other outer bearing unit component at the sides of said notches forming circumferentially-elongated fingers also extending circumferentially beyond the opposite ends of the diameter of said other component, said fingers being displaced laterally away from the central plane of said outer bearing unit.

2. A self-aligning spherical bearing comprising an annular outer bearing unit having a central plane and opposite sides disposed substantially parallel thereto, said outer bearing unit being composed of a pair of arcuate outer bearing unit components disposed in a substantially annular path with their adjacent ends disposed in interfitting relationship with one another, said outer bearing unit having a central opening therein containing a spherically-curved internally-concave annular surface forming a ball socket, and an inner ball member seated in said socket and having a spherically-curved convex outer surface fitting the spherically-curved concave surface of said socket, each of said arcuate outer bearing unit components having a circumferential extent exceeding a semi-circle, said ball member having a central plane passing through its center of curvature and cutaway opposite sides whereby rotation of said ball member into a position with its central plane approximately perpendicular to the central plane of said outer bearing unit releases the components thereof for disassembly but retains the same in assembly when said central planes are rotated substantially into coincidence with one another, one of said outer bearing unit components having circumferentially elongated tongues disposed at its opposite ends extending circumferentially beyond the opposite ends of the diameter of the component and the other outer bearing unit component having circumferentially-elongated notches receiving said tongues, the portions of said other outer bearing unit component at the sides of said notches forming fingers also extending circumferentially beyond the opposite ends of the diameter of said other component, said fingers being circumferentially elongated, said tongues and said fingers on their inner sides having spherically-curved surfaces of substantially the same curvature as the said concave surface of said socket and substantially forming a continuation thereof, said fingers being displaced laterally away from the central plane of said outer bearing unit.

References Cited in the file of this patent

UNITED STATES PATENTS 1,807,373    Blunt _____ May 26, 1931